(12) United States Patent
Wu et al.

(10) Patent No.: US 9,189,831 B2
(45) Date of Patent: Nov. 17, 2015

(54) IMAGE PROCESSING METHOD AND APPARATUS USING LOCAL BRIGHTNESS GAIN TO ENHANCE IMAGE QUALITY

(71) Applicant: Avisonic Technology Corporation, Hsin-Chu (TW)

(72) Inventors: Ming-Yang Wu, Hsinchu (TW); Chi-Chang Yu, Keelung (TW)

(73) Assignee: Avisonic Technology Corporation, Science-Based Industrial Park, Hsin-Chu (TW)

( * ) Notice: Subject to any disclaimer, the term of this patent is extended or adjusted under 35 U.S.C. 154(b) by 365 days.

(21) Appl. No.: 13/758,968

(22) Filed: Feb. 4, 2013

(65) Prior Publication Data

US 2014/0064613 A1 Mar. 6, 2014

(30) Foreign Application Priority Data

Aug. 30, 2012 (TW) .............................. 101131519 A

(51) Int. Cl.
  *G06K 9/00* (2006.01)
  *G06T 5/00* (2006.01)
  *H04N 1/407* (2006.01)
  *H04N 1/409* (2006.01)

(52) U.S. Cl.
  CPC ................. *G06T 5/001* (2013.01); *G06T 5/002* (2013.01); *G06T 5/003* (2013.01); *G06T 5/008* (2013.01); *H04N 1/409* (2013.01); *H04N 1/4072* (2013.01); *H04N 1/4092* (2013.01)

(58) Field of Classification Search
  USPC .................................................. 382/167, 260
  See application file for complete search history.

(56) References Cited

U.S. PATENT DOCUMENTS

| 2004/0218075 A1* | 11/2004 | Tsuruoka ...................... 348/272 |
| 2005/0157189 A1* | 7/2005 | Sambongi ..................... 348/241 |
| 2007/0196031 A1 | 8/2007 | Chen |
| 2008/0002902 A1 | 1/2008 | Lin |
| 2008/0218635 A1 | 9/2008 | Tsuruoka |

FOREIGN PATENT DOCUMENTS

| JP | 2003230052 A | 8/2003 |
| JP | WO2007037325 A1 | 4/2007 |
| JP | 2007142670 A | 6/2007 |
| JP | 2007336258 A | 12/2007 |
| JP | 2010193384 | * 9/2010 |
| JP | 2010193384 A | 9/2010 |
| TW | 201225678 | 6/2012 |
| TW | 201234863 | 8/2012 |
| WO | 2007037325 A1 | 4/2007 |
| WO | 2007063731 A1 | 6/2007 |

* cited by examiner

Primary Examiner — Yon Couso
(74) Attorney, Agent, or Firm — Winston Hsu; Scott Margo

(57) ABSTRACT

An image processing apparatus is provided. The image processing apparatus includes a local brightness adjustment circuit and an image enhancement circuit. The local brightness adjustment circuit is arranged to obtain a local brightness gain relation between an input image before a local brightness adjustment and the input image after the local brightness adjustment. The image enhancement circuit is coupled to the local brightness adjustment circuit, and is arranged to perform at least one of a noise reduction and an edge enhancement upon an image to be processed according to the local brightness gain relation to generate an output image.

18 Claims, 9 Drawing Sheets

IMAGE PROCESSING METHOD AND APPARATUS USING LOCAL BRIGHTNESS GAIN TO ENHANCE IMAGE QUALITY

BACKGROUND OF THE INVENTION

1. Field of the Invention

The disclosed embodiments of the present invention relate to image processing, and more particularly, to an image processing method using a local brightness gain to process an image for enhancing image quality and a related image processing apparatus.

2. Description of the Prior Art

Image enhancement, such as image contrast or dynamic range enhancement, may be employed in the image processing by adjusting the image brightness. However, the image brightness adjustment may be accompanied by image noise. One conventional method for reducing the image noise is to perform noise reduction upon the image according to the same parameter. When the denoise level is higher, the edge level would be lower (i.e. the image details of the image may blur or disappear); otherwise, the image noise may still be high in order to keep/enhance the image details. Therefore, when different image blocks in an image are processed by different brightness adjustment operations to enhance the image quality, the noise reduction performed upon the image may make image details blurred/lost or result in insufficient noise reduction in some image blocks.

Thus, how to reduce the image noise without blurring/losing the image details after the image enhancement operation is performed upon the image by locally adjusting image brightness has become a problem needed to be resolved.

SUMMARY OF THE INVENTION

It is therefore an objective of the present invention to provide an image processing method using a local brightness gain to process an image for enhancing image quality and a related image processing apparatus to solve the above-mentioned problem.

According to an embodiment of the present invention, an exemplary image processing method is disclosed. The exemplary image processing method includes the following steps: obtaining a local brightness gain relation between an input image before a local brightness adjustment and the input image after the local brightness adjustment; and performing at least one of a noise reduction and an edge enhancement upon an image to be processed according to the local brightness gain relation to generate an output image.

According to an embodiment of the present invention, an exemplary image processing apparatus is disclosed. The exemplary image processing apparatus includes a local brightness adjustment circuit and an image enhancement circuit. The local brightness adjustment circuit is arranged to obtain a local brightness gain relation between an input image before a local brightness adjustment and the input image after the local brightness adjustment. The image enhancement circuit is coupled to the local brightness adjustment circuit, and is arranged to perform at least one of a noise reduction and an edge enhancement upon an image to be processed according to the local brightness gain relation to generate an output image.

The proposed image processing method and related image processing apparatus may not only enhance image quality by locally adjusting brightness of an image, but also provide sufficient image processing capability of noise reduction and/or edge enhancement.

These and other objectives of the present invention will no doubt become obvious to those of ordinary skill in the art after reading the following detailed description of the preferred embodiment that is illustrated in the various figures and drawings.

DETAILED DESCRIPTION

The concept of the present invention is to locally perform the noise reduction and/or the edge enhancement operation based on brightness gains (respectively corresponding to image areas) obtained from the local brightness adjustment, thereby overcoming the problems associated with conventional global image processing. In other words, the proposed method and apparatus may perform local brightness adjustment and analysis upon a single image, and further execute suitable image processing operations upon different image areas, respectively. The overall image quality may therefore be enhanced. By way of example, but not limitation, the concept of the present invention may be applied to local noise reduction and/or local edge enhancement. Additionally, the local brightness adjustment may be implemented by various types of image adjustment operations. In one implementation, the local brightness adjustment may be a local tone mapping. For illustration convenience, the following uses local gain correction of the local tone mapping as one exemplary implementation of the local brightness adjustment.

Figure 1:
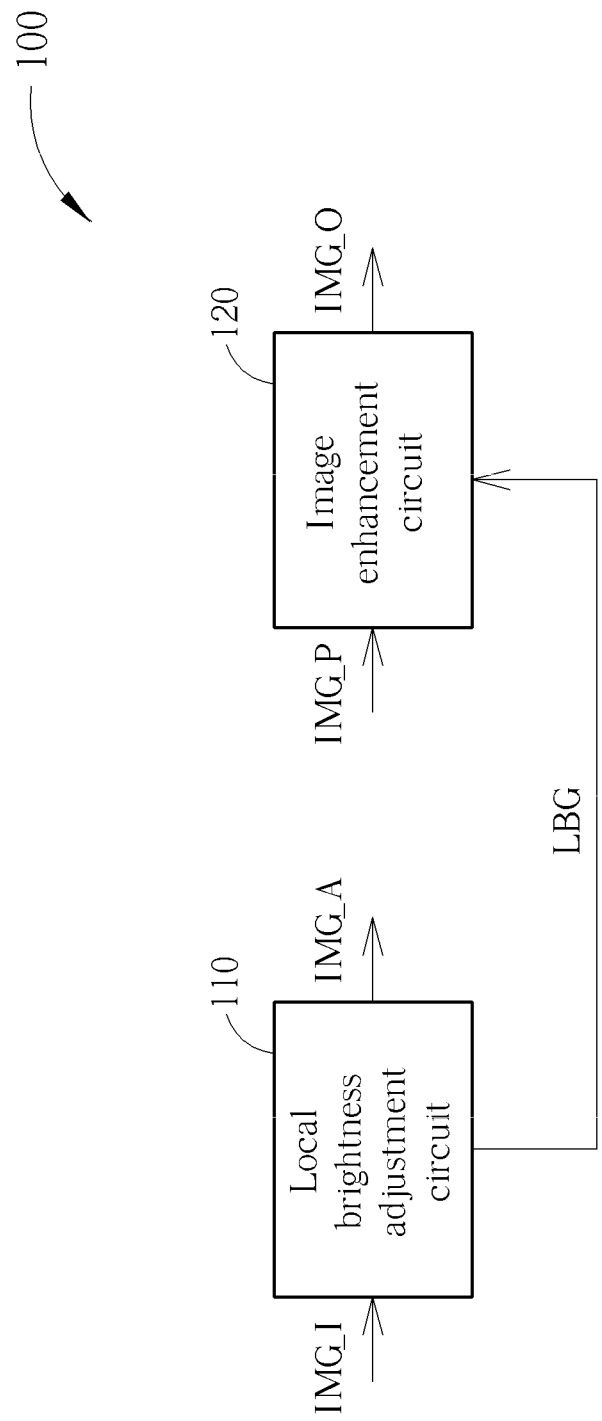
FIG. 1 is a block diagram illustrating an exemplary image processing apparatus according to a first embodiment of the present invention.

Please refer to FIG. 1, which is a block diagram illustrating an exemplary image processing apparatus according to a first embodiment of the present invention. As shown in FIG. 1, the image processing apparatus 100 includes, but is not limited to, a local brightness adjustment circuit 110 and an image enhancement circuit 120. In this embodiment, the local brightness adjustment circuit 110 is arranged to obtain a local brightness gain relation LBG between an input image IMG_I before a local brightness adjustment and the input image IMG_I after the local brightness adjustment. More specifically, the local brightness adjustment circuit 110 may perform the local brightness adjustment upon the received input image IMG_I to generate an adjusted image IMG_A, and the local brightness gain relation LBG corresponds to the input image IMG_I and the adjusted image _IMG_A. In an alternative design, the local brightness adjustment circuit 110 may obtain the local brightness gain relation LBG without outputting the adjusted image IMG_A.

Please note that the input image IMG_I may be raw data or image data in a color space. In a case where the input image IMG_I is raw data, the input image IMG_I may be Bayer pattern image data, and the adjusted image IMG_A may be converted into RGB image data by an image signal processor (not shown in FIG. 1) for further image enhancement. In another case where the input image IMG_I is image data in a color space, the input image IMG_I may be RGB image data or YUV image data.

The image enhancement circuit 120 is coupled to the local brightness adjustment circuit 110, and is arranged to perform at least one of a noise reduction and an edge enhancement upon an image to be processed IMG_P according to the local brightness gain relation LBG, and accordingly generate an output image IMG_O. In other words, the image enhancement circuit 120 may perform the noise reduction and the edge enhancement upon the image to be processed IMG_P simultaneously or separately, or perform only one of the noise reduction and the edge enhancement upon the image to be processed IMG_P.

The local brightness gain relation LBG referred to by the image enhancement circuit 120 may be derived from gain information of a current frame, or derived from gain information of a frame different from the current frame (e.g. a frame adjacent to the current frame). In a case where the local brightness gain relation LBG is derived from the gain information of the current frame, after the input image IMG_I is processed by the local brightness adjustment (executed by the local brightness adjustment circuit 110), the image to be processed IMG_P is generated. That is, the image to be processed IMG_P is the adjusted image IMG_A. In another case where the local brightness gain relation LBG is not derived from the gain information of the current frame, after an image different from the input image IMG_I is processed by the local brightness adjustment (executed by the local brightness adjustment circuit 110), the image to be processed IMG_P is generated. That is, the image to be processed IMG_P is different from the adjusted image IMG_A. For illustration convenience, the following embodiments are described based on the local brightness gain relation LBG which is derived from the gain information of the current frame. However, a person skilled in the art can readily understand that when the local brightness gain relation LBG is not derived from the gain information of the current frame, the same local brightness adjustment described hereinafter may still be feasible.

Figure 2:
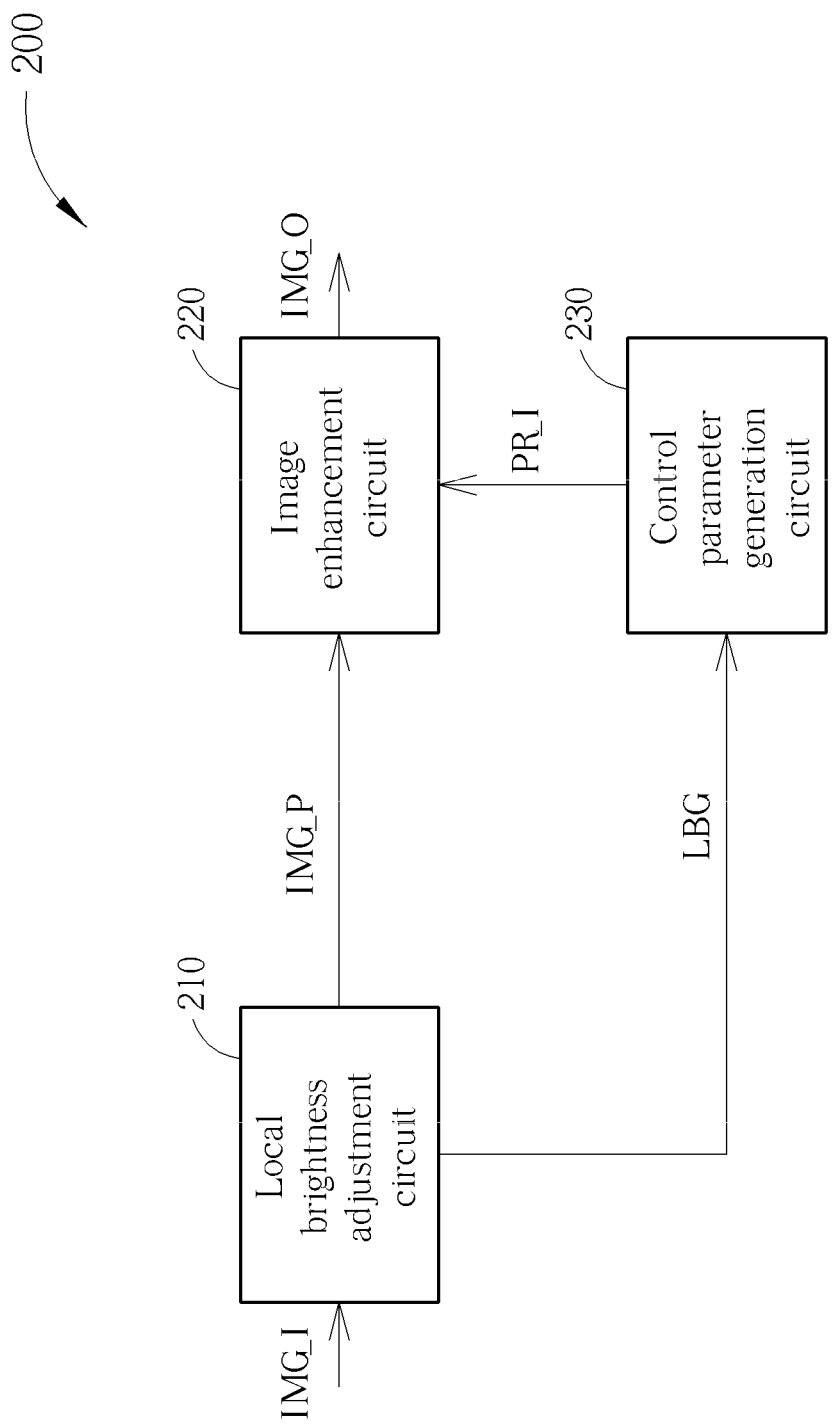
FIG. 2 is a block diagram illustrating an exemplary image processing apparatus according to a second embodiment of the present invention.

Please refer to FIG. 2, which is a block diagram illustrating an exemplary image processing apparatus according to a second embodiment of the present invention. As shown in FIG. 2, the image processing apparatus 200 includes a local brightness adjustment circuit 210, an image enhancement circuit 220 and a control parameter generation circuit 230. The local brightness adjustment circuit 210 is arranged to obtain a local brightness gain relation LBG between an input image IMG_I before a local brightness adjustment and the input image IMG_I after the local brightness adjustment; the control parameter generation circuit 230 is coupled to the local brightness adjustment circuit 210, and is arranged to generate at least one image control parameter PR_I to the image enhancement circuit 220 according to the local brightness gain relation LBG; and the image enhancement circuit 220 is coupled to the local brightness adjustment circuit 210, and is arranged to perform at least one of a noise reduction and an edge enhancement upon the image to be processed IMG_P according to the at least one image control parameter PR_I, and accordingly generate an output image IMG_O. In brief, in this embodiment, the local brightness adjustment circuit 210 may perform the local brightness adjustment upon the received input image IMG_I for generating the image to be processed IMG_P to the image enhancement circuit 220, and obtain the corresponding local brightness gain relation LBG for further noise reduction and/or edge enhancement.

Figure 3:
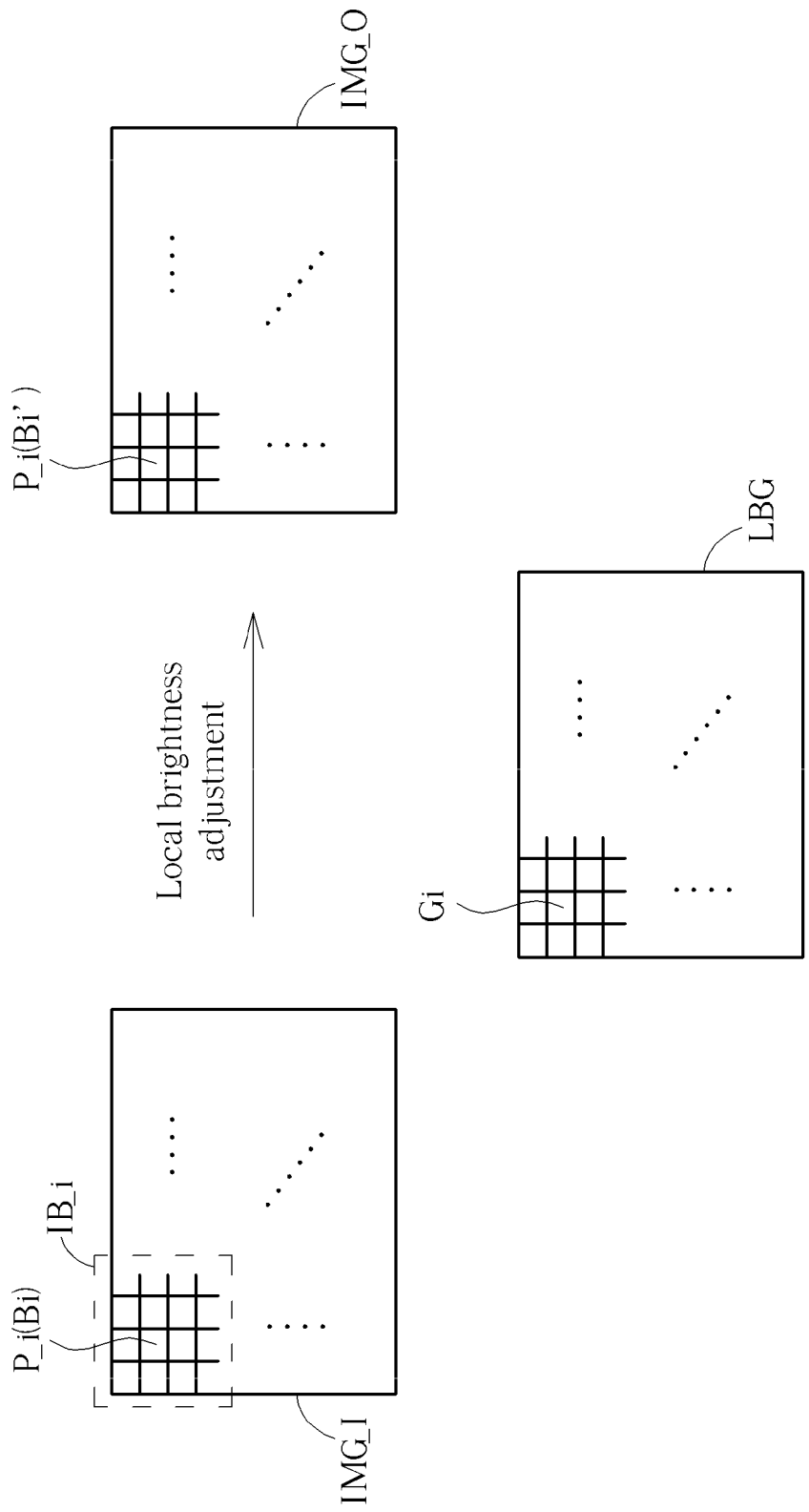
FIG. 3 is a diagram illustrating an implementation of the local brightness adjustment.

Please refer to FIG. 2 in conjunction with FIG. 3. FIG. 3 is a diagram illustrating an implementation of the local brightness adjustment. In this implementation, for each image unit (e.g. a pixel P_i) of the input image IMG_I, the local brightness adjustment circuit 210 may perform the local brightness adjustment by adjusting a brightness value (e.g. a brightness value Bi) of the image unit (e.g. the pixel P_i) according to a pixel value of an image block (e.g. an image block IB_i) including the image unit in the input image IMG_I. For example, the local brightness adjustment circuit 210 may provide a plurality of curve functions (e.g. a plurality of gamma functions), obtain a specific curve function (e.g. a specific gamma function) corresponding to the image unit according to an average pixel value (e.g. an average brightness value) of all pixel values of the image block I_Bi, and adjust the brightness value of the image unit according to the specific curve function.

More specifically, a maximum pixel value of the pixel P_i in the RGB color space may be used as the brightness value Bi of the pixel P_i. Next, an average brightness value of all pixel values in the image block IB_i is substituted into the curve functions to obtain a plurality of brightness values. The obtained brightness values are compared to a predetermined brightness value (e.g. a brightness level comfortable to user's eyes) to find a specific brightness value closest to the predetermined brightness value from the brightness values, and then a specific gamma function corresponding to the specific brightness value is obtained. Finally, the brightness value Bi of the pixel P_i is substituted into the specific gamma function to adjust the brightness value of the pixel P_i from Bi to Bi'. As a person skilled in the art should readily understand that the brightness value of each image unit of the input image IMG_I may be adjusted to an appropriate brightness value (e.g. a brightness level comfortable to user's eyes) based on the local brightness adjustment, further description is omitted here for brevity. After the local brightness adjustment is done, the local brightness adjustment circuit 210 may calculate a ratio (e.g. a brightness gain Gi) between a brightness value (e.g. the brightness value Bi) of the image unit (e.g. the pixel P_i) before the local brightness adjustment and a brightness value (e.g. the brightness value Bi') of the image unit (e.g. the pixel P_i) after the local brightness adjustment, thereby obtaining the local brightness gain relation LBG.

The above description is the method of performing the local brightness adjustment upon a single pixel by referring to an image block theresurrounding. In the example of the pixel P_i adjustment, the method may be summarized as follows.

(1) Use a maximum pixel value of the pixel P_i in the RGB color space as the brightness value Bi of the pixel P_i;

(2) Obtain an average brightness value of all pixel values in an image block (e.g. the image block IB_i) surrounding the pixel P_i;

(3) Substitute the average brightness value into the curve functions to obtain a specific gamma function;

(4) Adjust the brightness value of the pixel P_i from Bi to Bi' by substituting the brightness value Bi of the pixel P_i into the specific gamma function; and (5) Obtain the local brightness gain relation LBG by dividing the brightness value Bi' by the brightness value Bi.

Figure 4:
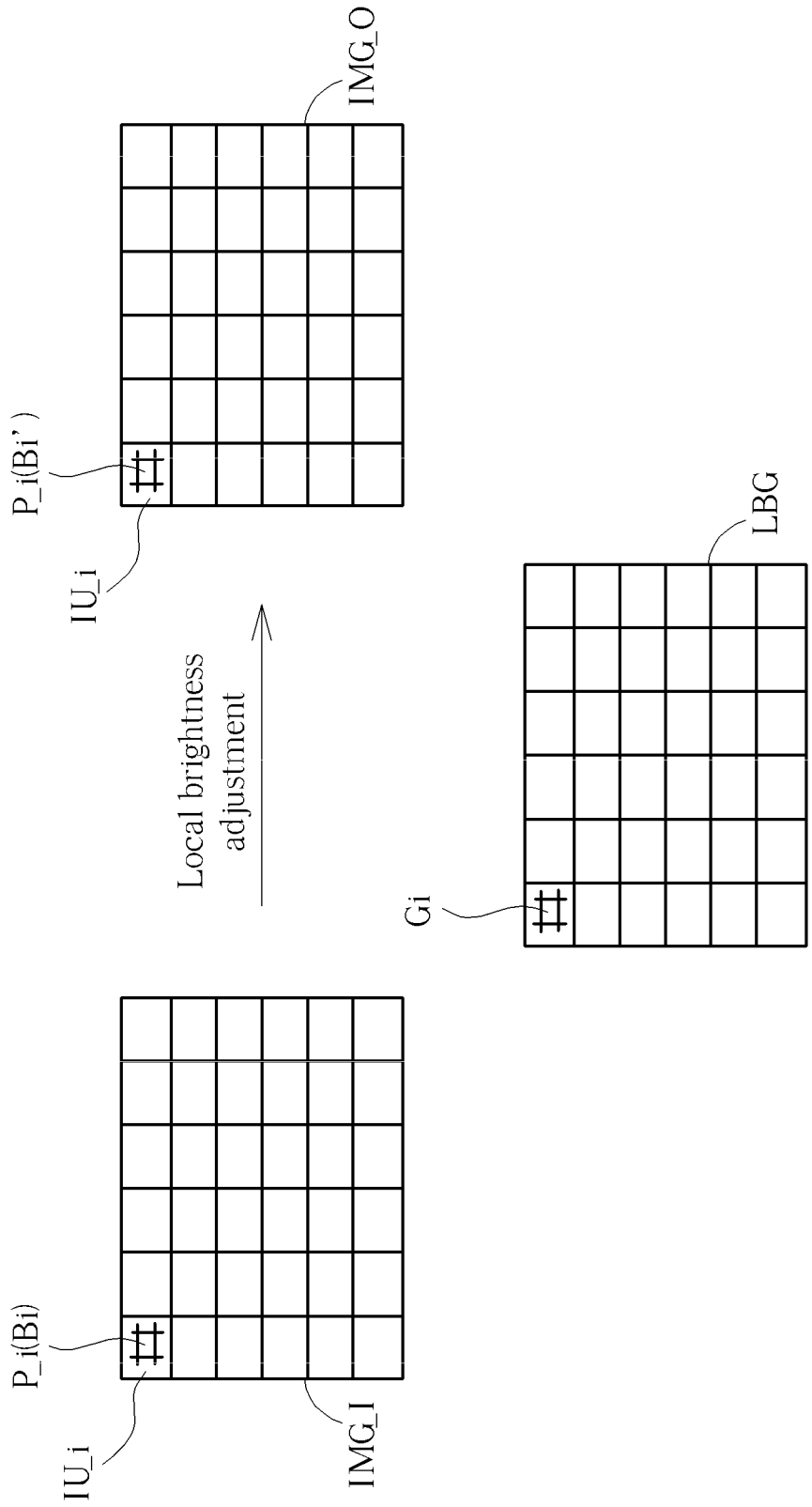
FIG. 4 is a diagram illustrating another implementation of the local brightness adjustment.

It should be noted that the above-mentioned image unit is not limited to a single pixel. Please refer to FIG. 2 in conjunction with FIG. 4. FIG. 4 is a diagram illustrating another implementation of the local brightness adjustment. The local brightness adjustment shown in FIG. 4 is based on that shown in FIG. 3, and the major difference therebetween is that each image unit shown in FIG. 4 is a block including a plurality of pixels (e.g. the image unit IU_i), and the local brightness adjustment shown in FIG. 4 further includes a downscaling operation and an upscaling operation.

In this embodiment, the local brightness adjustment circuit 210 may use a maximum pixel value of the pixel P_i (included in the image unit IU_i) in the RGB color space as the brightness value of the pixel P_i. The input image IMG_I may be divided into a plurality of image blocks to thereby downscale the size of the input image IMG_I (e.g. from 640×480 to 32×32), wherein each image block (e.g. the image unit IU_i) includes a plurality of pixels. Next, the local brightness adjustment circuit 210 may provide a plurality of curve functions (e.g. a plurality of gamma functions), obtain a specific curve function (e.g. a specific gamma function) corresponding to the image unit IU_i according to an average brightness value of all pixels in the image unit IU_i, and adjust a brightness value of each pixel in the image unit IU_i according to the specific curve function.

In a case where the size of the input image IMG_I is downscaled from 640×480 to 32×32, a 32×32 curve index image may be obtained by executing the above step of obtaining a specific gamma function corresponding to each image unit, wherein a curve index of the specific gamma function may be recorded in the 32×32 curve index image. Next, the 32×32 curve index image may be processed by a spatial filtering (e.g. a low-pass filtering) to reduce a halo effect, and then be upscaled to the size of the input image IMG_I (e.g. 640×480). Finally, a brightness value of each pixel (e.g. the pixel P_i) of each image block (e.g. the pixel unit IU_i) may be substituted into the corresponding specific function in the curve index image to adjust the brightness value of each pixel.

Please note that, in order to avoid a grid-pattern brightness distribution in the adjusted image IMG_P, the local brightness adjustment circuit 210 may perform a curve index calculation (e.g. an interpolation calculation) upon the 32×32 curve index image. Specific gamma functions respectively corresponding to pixels in each image unit may be obtained, and the 32×32 curve index image may be upscaled to the size of the input image IMG_I. Hence, a pixel value of a pixel in each image unit may be substituted into the corresponding gamma function to adjust a brightness value of the pixel.

The above description is the method of performing the local brightness adjustment upon a single pixel by referring to a curve index image. In the example of the pixel P_i adjustment, the method may be summarized as follows.

(1) Use a maximum pixel value of the pixel P_i in the RGB color space as the brightness value Bi of the pixel P_i;
(2) Divide the input image IMG_I into a plurality of image blocks (each of the image blocks (e.g. the image unit IU_i) includes a plurality of pixels) to downscale the size of the input image IMG_I (e.g. from 640×480 to 32×32);
(3) Obtain a corresponding specific curve function of each image unit according to an average brightness value of all pixel values in the image unit, and accordingly obtain the 32×32 curve index image;
(4) Perform a spatial filtering upon the 32×32 curve index image;
(5) Upscale the size of 32×32 curve index image to that of the input image IMG_I (e.g. from 32×32 to 640×480);
(6) Adjust the brightness value of the pixel P_i from Bi to Bi' by substituting the brightness value Bi of the pixel P_i into the corresponding specific gamma function of the curve index image; and
(7) Obtain the local brightness gain relation LBG by dividing the brightness value Bi' by the brightness value Bi.

In brief, the local brightness adjustment circuit 210 may obtain the local brightness gain relation LBG by calculating a ratio (e.g. a brightness gain Gi) between a brightness value of an image unit (or a pixel) in the input image IMG_I before the local brightness adjustment and a brightness value of the image unit (or the pixel) after the local brightness adjustment. In an alternative design, when the local brightness adjustment circuit 110/210 shown in FIG. 1/FIG. 2 performs the local brightness adjustment operation, the input image IMG_I may include an image unit having a single pixel and another image unit having a plurality of pixels.

Figure 5:
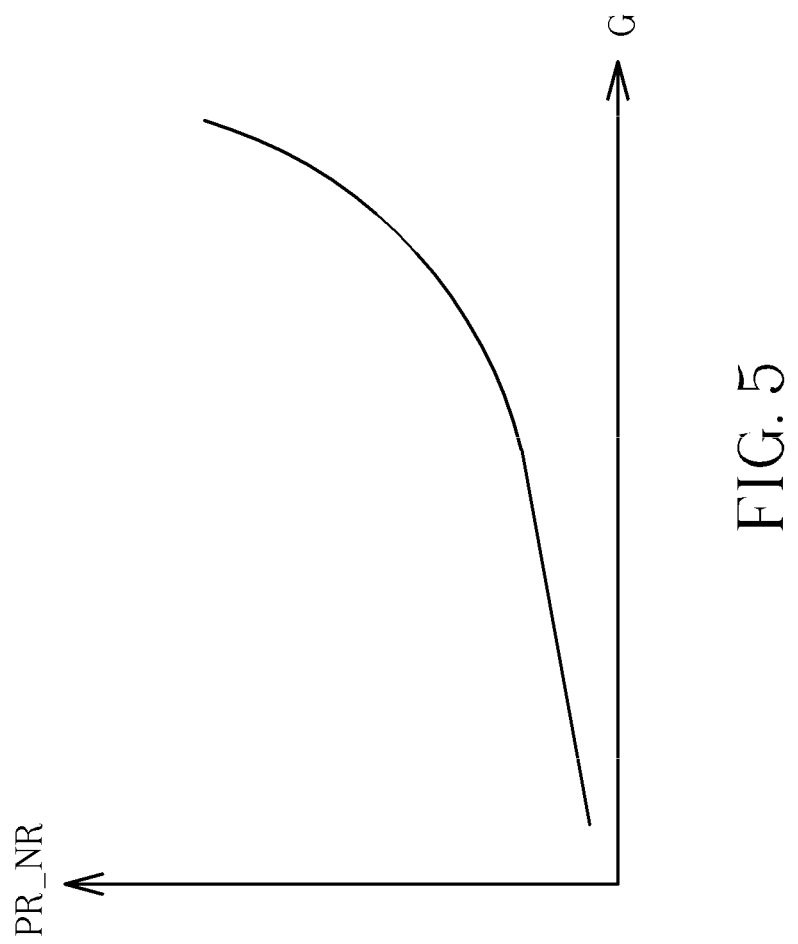
FIG. 5 is a diagram illustrating an image correction relation according to an embodiment of the present invention.

Please refer to FIG. 2 again. After the local brightness adjustment circuit 210 obtains the local brightness gain relation LBG, the control parameter generation circuit 230 may generate at least one image control parameter corresponding to each image unit according to the local brightness gain relation LBG (e.g. a brightness gain of each image unit in the adjusted image IMG_A/the image to be processed IMG_P). The control parameter generation circuit 230 may further provide at least one image correction relation, and generate at least one image control parameter PR_I according to the at least one image correction relation and a brightness gain (corresponding to the image unit) of the local brightness gain relation LBG. Please refer to FIG. 2 in conjunction with FIG. 5. FIG. 5 is a diagram illustrating an image correction relation according to an embodiment of the present invention. In this embodiment, the image correction relation is a conversion relation between a brightness gain G and a noise reduction control parameter PR_NR (which is used for controlling the noise reduction and the edge enhancement simultaneously), wherein the image correction relation may be obtained from correction. Specifically, as the larger brightness gain G implies the higher noise, the stronger noise reduction and the weaker edge enhancement are required; otherwise, as the smaller brightness gain G implies the lower noise, the weaker noise reduction and the stronger edge enhancement are required. Therefore, when the brightness gain G is large, the value of the noise reduction control parameter PR_NR is high for providing the stronger noise reduction and the weaker edge enhancement; otherwise, when the brightness gain G is small, the value of the noise reduction control parameter PR_NR is low for providing he weaker noise reduction and the stronger edge enhancement.

Figure 6:
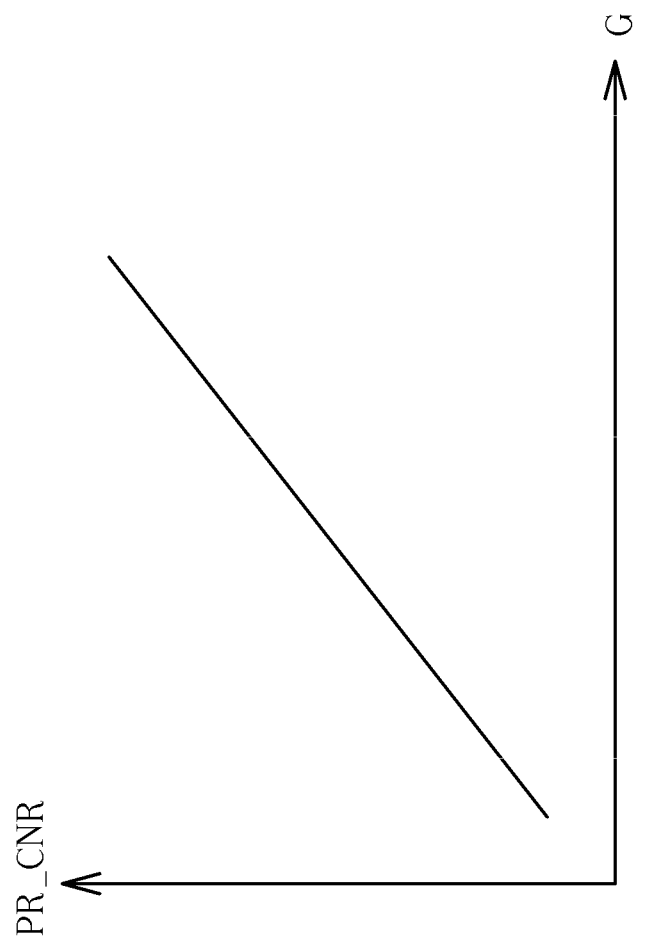
FIG. 6 is a diagram illustrating an image correction relation according to another embodiment of the present invention.

Please note that the noise reduction control parameter PR_NR may be replaced by an edge enhancement control parameter. For example, when the brightness gain G is large, the value of the edge enhancement control parameter is low for providing the weaker edge enhancement and the stronger noise reduction. Additionally, the above image correction relation is not meant to be a limitation of the present invention. In other words, the control parameter generation circuit 230 may provide different image correction relations based on actual designs/requirements. For example, the control parameter generation circuit 230 may provide an image correction relation for performing one of the noise reduction and the edge enhancement, a combined image correction relation for simultaneously performing the noise reduction and the edge enhancement, or an image correction relation for performing a chroma noise reduction (CNR) (i.e. a conversion relation between a chroma noise reduction control parameter PR_CNR and a brightness gain G) as shown in FIG. 6.

In addition to generating the at least one image control parameter PR_I according to at least one image correction relation and a brightness gain (corresponding to an image unit) of the local brightness gain relation LBG, the control parameter generation circuit 230 may provide at least one image control parameter lookup table, and generate the at least one image control parameter PR_I according to the at least one image parameter lookup table and the brightness gain. In other words, the control parameter generation circuit 230 may refer to the built-in image control parameter lookup table to generate the at least one image control parameter PR_I corresponding to the received local brightness gain relation LBG. Next, the image enhancement circuit 220 may perform image enhancement according to the at least one image control parameter PR_I. The operation principle of the image enhancement is detailed as follows.

Figure 7:
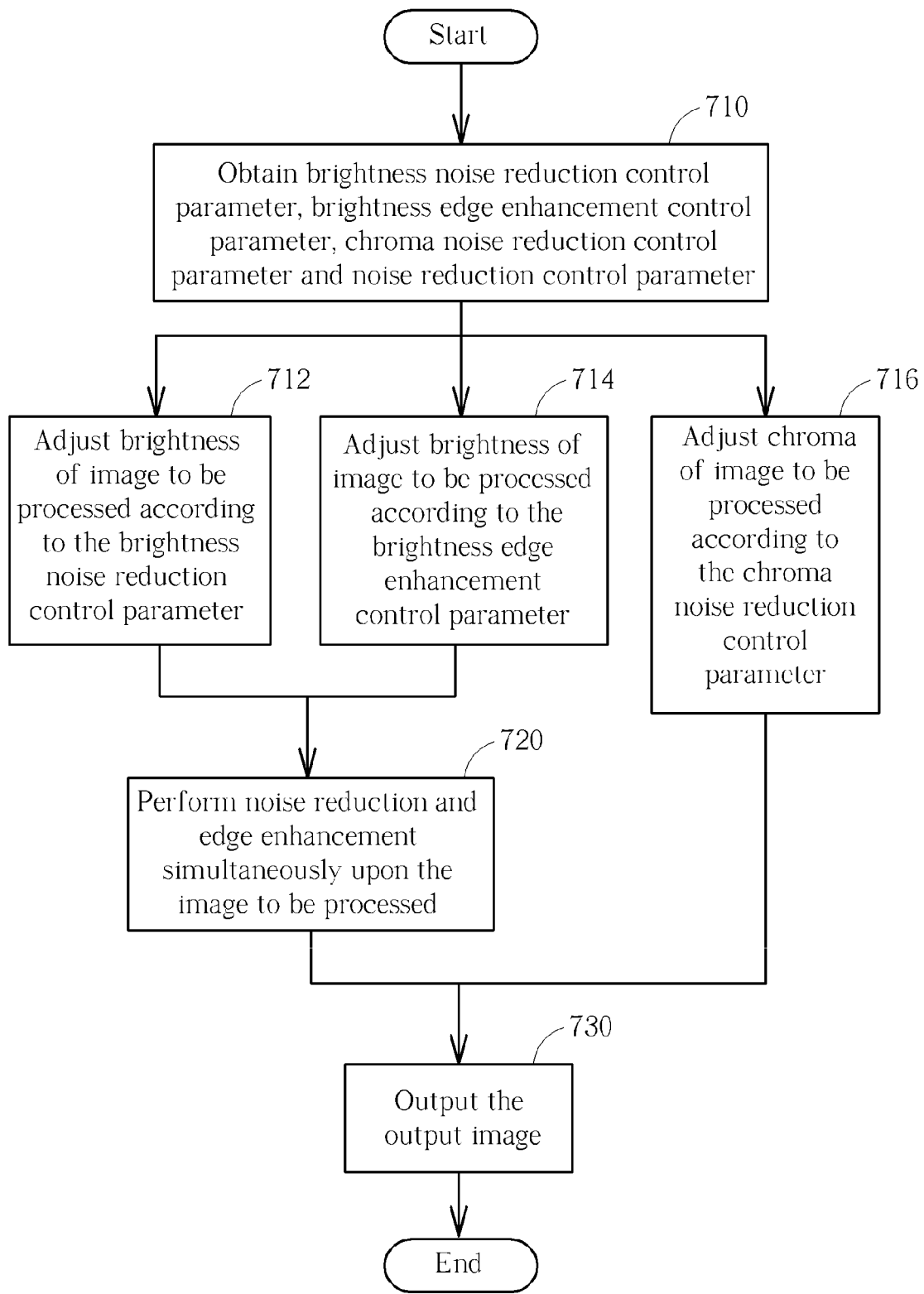
FIG. 7 is a flowchart illustrating an implementation of image enhancement according to a local brightness gain relation.

Please refer to FIG. 7 in conjunction with FIG. 2. FIG. 7 is a flowchart illustrating an implementation of image enhancement according to a local brightness gain relation. First, in step 710, the control parameter generation circuit 230 may refer to the image correction relation/image control parameter lookup table to thereby obtain the following control parameters according to the local brightness gain relation LBG, respectively, where the obtained control parameters may include at least one brightness noise reduction control parameter PR_a (corresponding to luma/brightness), at least one brightness edge enhancement control parameter PR_b (corresponding to luma/brightness), at least one chroma noise reduction control parameter PR_CNR (corresponding to chroma), and a noise reduction control parameter PR_NR (required for performing the noise reduction and the edge enhancement upon an image unit simultaneously). In step 712 and step 714, the image enhancement circuit 220 may adjust brightness Y of an image unit in the image to be processed IMG_P to brightness YNR and brightness YEE according to the obtained brightness noise reduction control parameter PR_a and brightness edge enhancement control parameter PR_b, respectively. Similarly, in step 716, the image enhancement circuit 220 may adjust chroma UV of the image unit in the image to be processed IMG_P to chroma UVO according to the obtained chroma noise reduction control parameter PR_CNR. Next, in step 720, the image enhancement circuit 220 may output brightness YO of the output image IMG_O according to the following function.

$$YO=(PR\_d \times YEE+PR\_NR \times YNR)/(PR\_d+PR\_NR)$$

The edge enhancement control parameter PR_d of the above function may be obtained by performing a filtering operation upon the image unit in the image to be processed IMG_P. As can be seen from the above function, the noise reduction control parameter PR_NR having a larger parameter value may provide stronger noise reduction and weaker edge enhancement; otherwise, the noise reduction control parameter PR_NR having a smaller parameter value may provide weaker noise reduction and stronger edge enhancement. Hence, the image enhancement circuit 220 may perform the noise reduction and the edge enhancement simultaneously upon the image to be processed IMG_P, thereby outputting the output image IMG_O having the brightness YO and the chroma UVO, as shown in step 730.

In brief, the control parameter generation circuit 230 may provide at least one image control parameter to an image unit according to at least one image correction relation and a brightness gain of the local brightness gain relation LBG, and the image enhancement circuit 220 may adaptively enhance the image quality of image units having different brightness values in the input image IMG_I. It should be noted that the image control parameter PR_I shown in FIG. 2 is not limited to the control parameters PR_a, PR_b, PR_CNR and PR_NR, and the image enhancement circuit 220 may refer to the control parameters PR_a/PR_b/PR_CNR simultaneously to process the image unit. Therefore, the image control parameter(s) may be used according to different image quality requirements/view preferences, and then the desired output image IMG_O may be obtained.

The implementation of the image enhancement procedure shown in FIG. 7 is for illustrative purposes only, and is not meant to be a limitation of the present invention. For example, when the image enhancement circuit 220 sequentially performs the noise reduction and the edge enhancement upon the image to be processed IMG_P, the control parameter generation circuit 230 may not generate the noise reduction control parameter PR_NR. In addition, the image enhancement circuit 220 may firstly adjust brightness of an image unit in the image to be processed IMG_P according to one of the brightness noise reduction control parameter PR_a and the brightness edge enhancement control parameter PR_b, and then adjust the brightness of the image unit in the image to be processed IMG_P according to the other of the brightness noise reduction control parameter PR_a and the brightness edge enhancement control parameter PR_b, thereby outputting the output image IMG_O processed by the image enhancement. Further description is detailed as follows.

Figure 8:
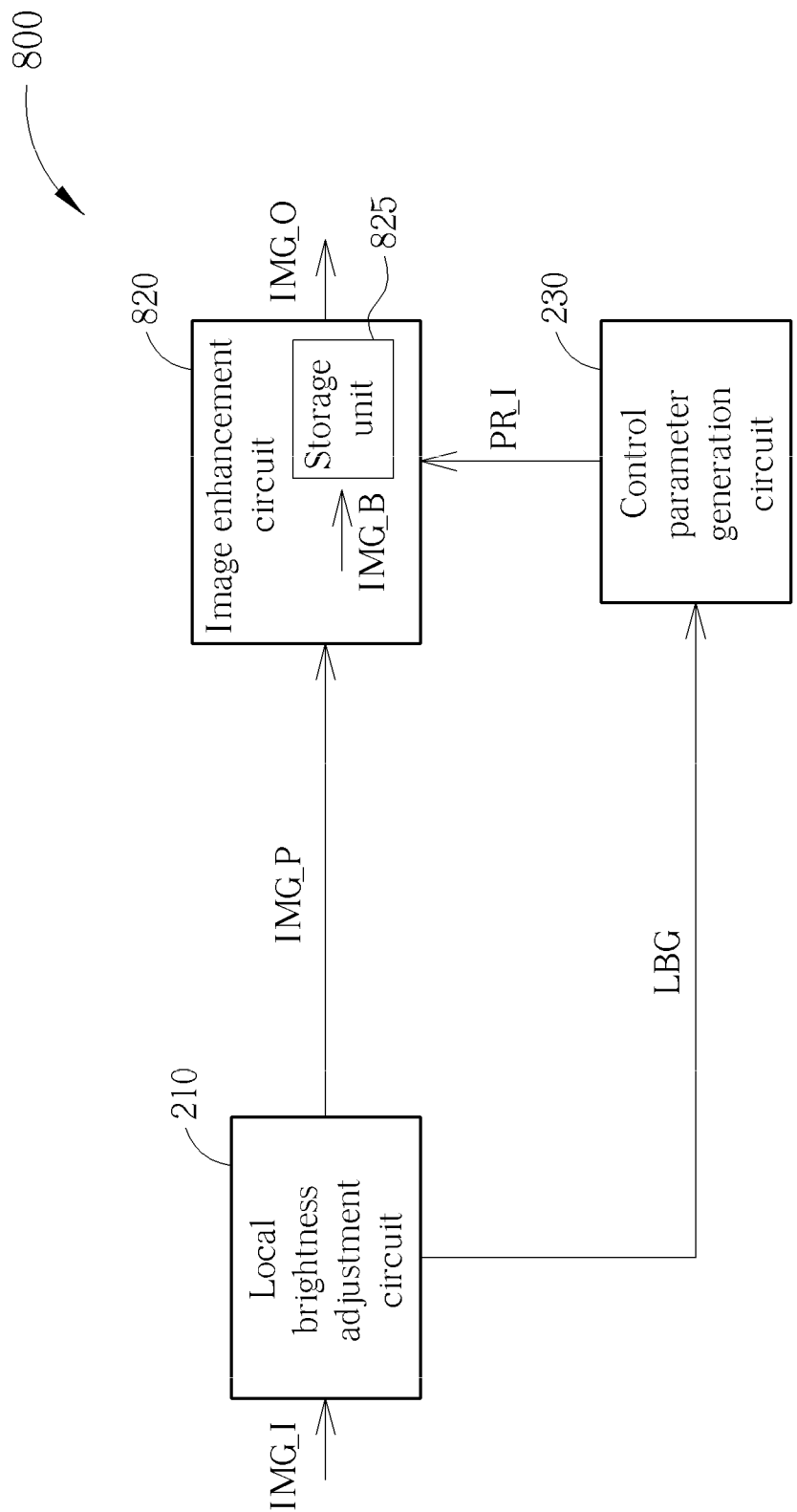
FIG. 8 is a block diagram illustrating an exemplary image processing apparatus according to a third embodiment of the present invention.

Please refer to FIG. 8, which is a block diagram illustrating an exemplary image processing apparatus according to a third embodiment of the present invention. The architecture of the image processing apparatus 800 shown in FIG. 8 is based on that of the image processing apparatus 200 shown in FIG. 2, and the major difference therebetween is that the image enhancement 820 includes a storage unit 825 for storing a temporarily stored image IMG_B. The image enhancement circuit 820 may perform one of the noise reduction and the edge enhancement upon the image to be processed IMG_P according to at least one image control parameter PR_I, and then generate the temporarily stored image IMG_B to the storage unit 825. In addition, the image enhancement circuit 820 may perform the other of the noise reduction and the edge enhancement upon the temporarily stored image IMG_B (stored in the storage unit 825) according to the local brightness gain relation LBG, and then generate the output image IMG_O. In one exemplary implementation, the image enhancement circuit 820 may sequentially perform the noise reduction and the edge enhancement according to the same image control parameter. In another implementation, at least one image control parameter PR_I may include a control parameter corresponding to the noise reduction and another control parameter corresponding to the edge enhancement, and the image enhancement circuit 820 may sequentially perform the noise reduction and the edge enhancement according to the above control parameters. Additionally, the control parameter generation circuit 230 is optional. That is, the image enhancement circuit 820 may perform at least one of the noise reduction and the edge enhancement upon the image to be processed IMG_P directly according to the local brightness gain relation LBG. In an alternative design, the control parameter generation circuit 230 may be implemented in the image enhancement circuit 820. As a person skilled in the art can readily understand the operation principle of the image apparatus 800 shown in FIG. 8 after reading the description directed to FIGS. 1-7, further description is omitted here for brevity.

Figure 9:
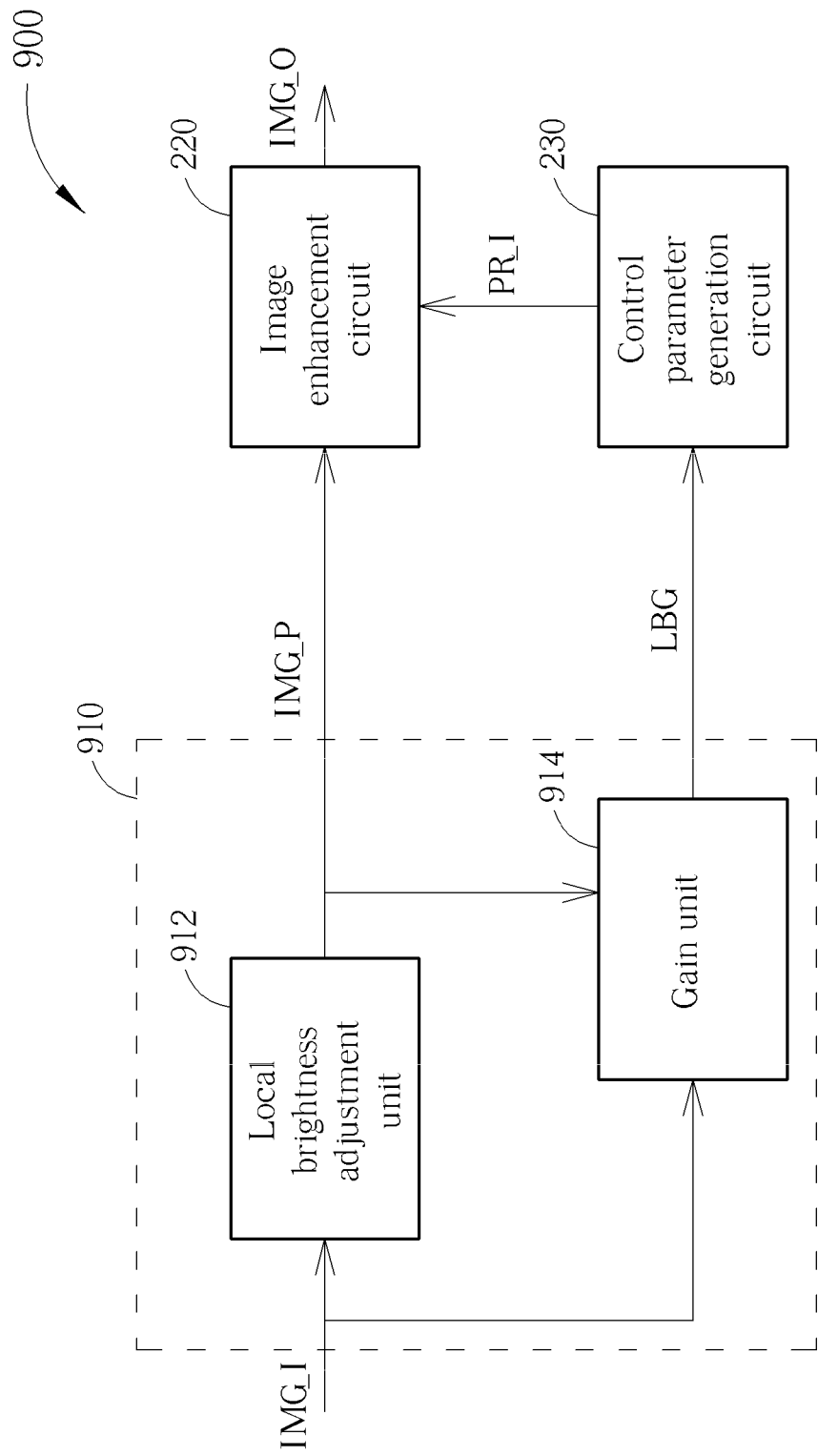
FIG. 9 is a block diagram illustrating an exemplary image processing apparatus according to a fourth embodiment of the present invention.

Please refer to FIG. 9, which is a block diagram illustrating an exemplary image processing apparatus according to a fourth embodiment of the present invention. The architecture of the image processing apparatus 900 shown in FIG. 9 is based on that of the image processing apparatus 200 shown in FIG. 2, and the major difference therebetween is that the local brightness adjustment circuit 910 includes a local brightness adjustment unit 912 and a gain unit 914. The local brightness adjustment unit 912 is arranged to perform local brightness adjustment upon the input image IMG_I to generate the image to be processed IMG_P, and the gain unit 914 is arranged to obtain the local brightness gain relation LBG according to a brightness change of each image unit of the input image IMG_I/the image to be processed IMG_P. As a person skilled in the art can readily understand the operation principle of the image apparatus 900 shown in FIG. 9 after reading the description directed to FIGS. 1-7, further description is omitted here for brevity.

To sum up, in a preferred embodiment, the proposed image processing method and related image processing apparatus may not only enhance image quality by locally adjusting brightness of an image, but also provide sufficient image processing capability of noise reduction and/or edge enhancement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
obtaining a local brightness gain relation between an input image before a local brightness adjustment and the input image after the local brightness adjustment; and
performing at least one of a noise reduction and an edge enhancement upon an image to be processed according to the local brightness gain relation to generate an output image;
wherein the local brightness adjustment comprises:
for each image unit of the input image:
adjusting a brightness value of the image unit according to a pixel value of an image block including the image unit in the input image;
wherein the image unit of the input image comprises at least one pixel; and the step of adjusting the brightness value of the image unit according to the pixel value of the image block including the image unit in the input image comprises:
providing a plurality of curve functions;
obtaining a specific curve function of the plurality of curve functions corresponding to the image unit according to an average pixel value of all pixel values of the image block; and
adjusting the brightness value of the image unit according to the specific curve function;
wherein the step of adjusting the brightness value of the image unit according to the specific curve function comprises:
performing a curve index calculation upon the image unit according to the specific curve function, and accordingly obtaining a plurality of specific curve functions respectively corresponding to a plurality of pixels included in the image unit; and
adjusting a plurality of brightness values of the pixels according to the specific curve functions, respectively.

2. The image processing method of claim 1, wherein the image to be processed is generated after the input image is processed by the local brightness adjustment or after another input image different from the input image is processed by the local brightness adjustment.

3. The image processing method of claim 1, wherein the local brightness adjustment is a local tone mapping.

4. The image processing method of claim 1, wherein the step of obtaining the local brightness gain relation comprises:
for each image unit of the input image:
calculating a ratio between a brightness value of the image unit before the local brightness adjustment and a brightness value of the image unit after the local brightness adjustment.

5. The image processing method of claim 1, wherein the noise reduction and the edge enhancement are performed upon the image to be processed simultaneously.

6. The image processing method of claim 1, wherein the step of performing at least one of the noise reduction and the edge enhancement upon the image to be processed according to the local brightness gain relation to generate the output image comprises:
performing one of the noise reduction and the edge enhancement upon the image to be processed according to the local brightness gain relation, and accordingly generating a temporarily stored image; and
performing the other of the noise reduction and the edge enhancement upon the temporarily stored image according to the local brightness gain relation, and accordingly generating the output image.

7. The image processing method of claim 1, wherein the step of performing at least one of the noise reduction and the edge enhancement upon the image to be processed according to the local brightness gain relation to generate the output image comprises:
for each image unit of the image to be processed:
generating at least one image control parameter according to the local brightness gain relation; and
performing at least one of the noise reduction and the edge enhancement upon the image unit according to the at least one image control parameter;
wherein the image unit of the image to be processed comprises at least one pixel.

8. The image processing method of claim 7, wherein the step of generating the at least one image control parameter according to the local brightness gain relation comprises:
providing at least one image correction relation; and
generating the at least one image control parameter according to the at least one image correction relation and a brightness gain to which the image unit corresponds in the local brightness gain relation.

9. The image processing method of claim 7, wherein the step of generating the at least one image control parameter according to the local brightness gain relation comprises:
providing at least one image control parameter lookup table; and
generating the at least one image control parameter according to the at least one image control parameter lookup table and a brightness gain to which the image unit corresponds in the local brightness gain relation.

10. An image processing apparatus, comprising:
a local brightness adjustment circuit, arranged for obtaining a local brightness gain relation between an input image before a local brightness adjustment and the input image after the local brightness adjustment; and
an image enhancement circuit, coupled to the local brightness adjustment circuit, the image enhancement circuit arranged for performing at least one of a noise reduction and an edge enhancement upon an image to be processed according to the local brightness gain relation to generate an output image;
wherein for each image unit of the input image:

the local brightness adjustment circuit further performs the local brightness adjustment by adjusting a brightness value of the image unit according to a pixel value of an image block including the image unit in the input image, wherein the image unit of the input image comprises at least one pixel;

wherein the local brightness adjustment circuit further provides a plurality of curve functions, obtains a specific curve function of the plurality of curve functions corresponding to the image unit according to an average pixel value of all pixel values of the image block, and adjusts the brightness value of the image unit according to the specific curve function;

wherein the local brightness adjustment circuit further performs a curve index calculation upon the image unit according to the specific curve function and accordingly obtains a plurality of specific curve functions respectively corresponding to a plurality of pixels included in the image unit, and adjusts a plurality of brightness values of the pixels according to the specific curve functions, respectively.

11. The image processing apparatus of claim 10, wherein the local brightness adjustment circuit further performs the local brightness adjustment upon the input image or another input image different from the input image to generate the image to be processed.

12. The image processing apparatus of claim 10, wherein the local brightness adjustment is a local tone mapping.

13. The image processing apparatus of claim 10, wherein for each image unit of the input image:
the local brightness adjustment circuit obtains the local brightness gain relation by calculating a ratio between a brightness value of the image unit before the local brightness adjustment and a brightness value of the image unit after the local brightness adjustment.

14. The image processing apparatus of claim 10, wherein the image enhancement circuit performs the noise reduction and the edge enhancement upon the image to be processed simultaneously.

15. The image processing apparatus of claim 10, wherein the image enhancement circuit comprises:
a storage unit, for storing a temporarily stored image;
wherein the image enhancement circuit performs one of the noise reduction and the edge enhancement upon the image to be processed according to the local brightness gain relation to generate a temporarily stored image, and performs the other of the noise reduction and the edge enhancement upon the temporarily stored image according to the local brightness gain relation to generate the output image.

16. The image processing apparatus of claim 10, further comprising:
a control parameter generation circuit, coupled between the local brightness adjustment circuit and the image enhancement circuit, wherein for each image unit of the image to be processed, the control parameter generation circuit is arranged to generate at least one image control parameter according to the local brightness gain relation;
wherein the image unit of the image to be processed comprises at least one pixel, and the image enhancement circuit performs at least one of the noise reduction and the edge enhancement upon the image unit according to the at least one image control parameter for generating the output image.

17. The image processing apparatus of claim 16, wherein the control parameter generation circuit further provides at least one image correction relation, and generates the at least one image control parameter according to the at least one image correction relation and a brightness gain to which the image unit corresponds in the local brightness gain relation.

18. The image processing apparatus of claim 16, wherein the control parameter generation circuit further provides at least one image control parameter lookup table, and generates the at least one image control parameter according to the at least one image control parameter lookup table and a brightness gain to which the image unit corresponds in the local brightness gain relation.

* * * * *